(12) United States Patent
Shimizu et al.

(10) Patent No.: US 7,444,038 B2
(45) Date of Patent: Oct. 28, 2008

(54) IMAGE CORRECTION APPARATUS AND IMAGE CORRECTING METHOD

(75) Inventors: Masayoshi Shimizu, Kawasaki (JP); Shoji Suzuki, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 751 days.

(21) Appl. No.: 09/819,731

(22) Filed: Mar. 29, 2001

(65) Prior Publication Data
US 2002/0051584 A1 May 2, 2002

(30) Foreign Application Priority Data
Oct. 3, 2000 (JP) ............................. 2000-303209

(51) Int. Cl.
*G06K 9/03* (2006.01)
(52) U.S. Cl. .................. 382/311; 345/589; 358/1.9; 358/461; 358/518; 358/520; 382/167; 382/274; 382/275
(58) Field of Classification Search .............. 235/440; 345/156, 418, 427, 589–596, 604, 615, 707, 345/617; 348/297, 651; 382/162, 167, 175, 382/205, 305, 164, 274, 275, 311; 358/1.1, 358/1.9, 3.06, 3.1, 3.13, 518, 3.27, 416, 520
See application file for complete search history.

(56) References Cited

U.S. PATENT DOCUMENTS

| 5,218,671 | A | * | 6/1993 | Liao et al. ................... 345/595 |
|---|---|---|---|---|
| 5,479,207 | A | * | 12/1995 | Degi et al. ................... 348/297 |
| 5,775,918 | A | * | 7/1998 | Yanagida et al. ............. 434/353 |
| 5,809,216 | A | * | 9/1998 | Ng ................................ 358/1.9 |
| 5,809,366 | A | * | 9/1998 | Yamakawa et al. ............ 399/39 |
| 5,874,988 | A | * | 2/1999 | Gu ............................... 348/97 |
| 6,008,812 | A | * | 12/1999 | Ueda et al. ................... 345/418 |
| 6,031,543 | A | * | 2/2000 | Miyashita et al. ............ 345/593 |
| 6,105,045 | A | * | 8/2000 | Kurabayashi et al. ........ 715/526 |
| 6,128,013 | A | * | 10/2000 | Prabhu et al. ................ 345/707 |
| 6,155,488 | A | * | 12/2000 | Olmstead et al. ............ 235/440 |
| 6,247,009 | B1 | * | 6/2001 | Shiiyama et al. ................ 707/3 |
| 6,281,872 | B1 | * | 8/2001 | Cariffe ........................ 345/658 |
| 6,351,560 | B1 | * | 2/2002 | Hashimoto ................... 382/181 |
| 6,434,272 | B1 | * | 8/2002 | Saarelma ..................... 382/224 |
| 6,441,869 | B1 | * | 8/2002 | Edmunds ..................... 348/651 |
| 6,494,557 | B1 | * | 12/2002 | Kato et al. ..................... 347/19 |

(Continued)

FOREIGN PATENT DOCUMENTS

JP 3-102969 4/1991

(Continued)

OTHER PUBLICATIONS

Juha Katajamaki, et al., "Image dependent Gamma Selection Based on Color Palette Equalization and a Simple Lightness Model", The Seventh Color Imaging Conference: Color Science, Systems, and Applications, pp. 301-306, 1999.*

(Continued)

*Primary Examiner*—Gregory M Desire
(74) *Attorney, Agent, or Firm*—Staas & Halsey LLP

(57) ABSTRACT

Images at two or more correction levels are output as corrected images for a given image, and a user is allowed to select a preferred corrected image. Based on the selection result of the user, an image to be corrected which is different from the given image is corrected.

9 Claims, 21 Drawing Sheets

U.S. PATENT DOCUMENTS

| | | | |
|---|---|---|---|
| 6,556,875 B1 * | 4/2003 | Nagasaka et al. | 700/19 |
| 6,577,761 B1 * | 6/2003 | Kanno et al. | 382/167 |
| 6,701,011 B1 * | 3/2004 | Nakajima | 382/167 |
| 6,750,892 B2 * | 6/2004 | Suzuki | 347/133 |
| 6,947,594 B2 * | 9/2005 | Watanabe et al. | 382/167 |
| 7,016,077 B2 * | 3/2006 | Semba et al. | 358/1.9 |
| 7,324,673 B1 * | 1/2008 | Yamanaka et al. | 382/128 |
| 2002/0051584 A1 * | 5/2002 | Shimizu et al. | 382/311 |
| 2005/0152613 A1 * | 7/2005 | Okutsu et al. | 382/254 |

FOREIGN PATENT DOCUMENTS

| | | |
|---|---|---|
| JP | 8-18803 | 1/1996 |
| JP | 10-23275 | 1/1998 |
| JP | 11-345321 | 12/1999 |

OTHER PUBLICATIONS

Dr. R. W. G. Hunt, "The Reproduction of Colour," Fountain Press, p. 80, pp. 455-458, 1995.

Juha Katajamaki, et al., "Image Dependent Gamma Selection Based on Color Palette Equalization and a Simple Lightness Model", The Seventh Color Imaging Conference: Color Science, Systems, and Applications, pp. 301-306.

Office Action issued in corresponding Japanese Patent Application No. 2000-303209; mailed on Nov. 6, 2007.

Japanese Office Action, mailed Apr. 1, 2008 and issued in corresponding Japanese Patent Application No. 2000-303209.

* cited by examiner

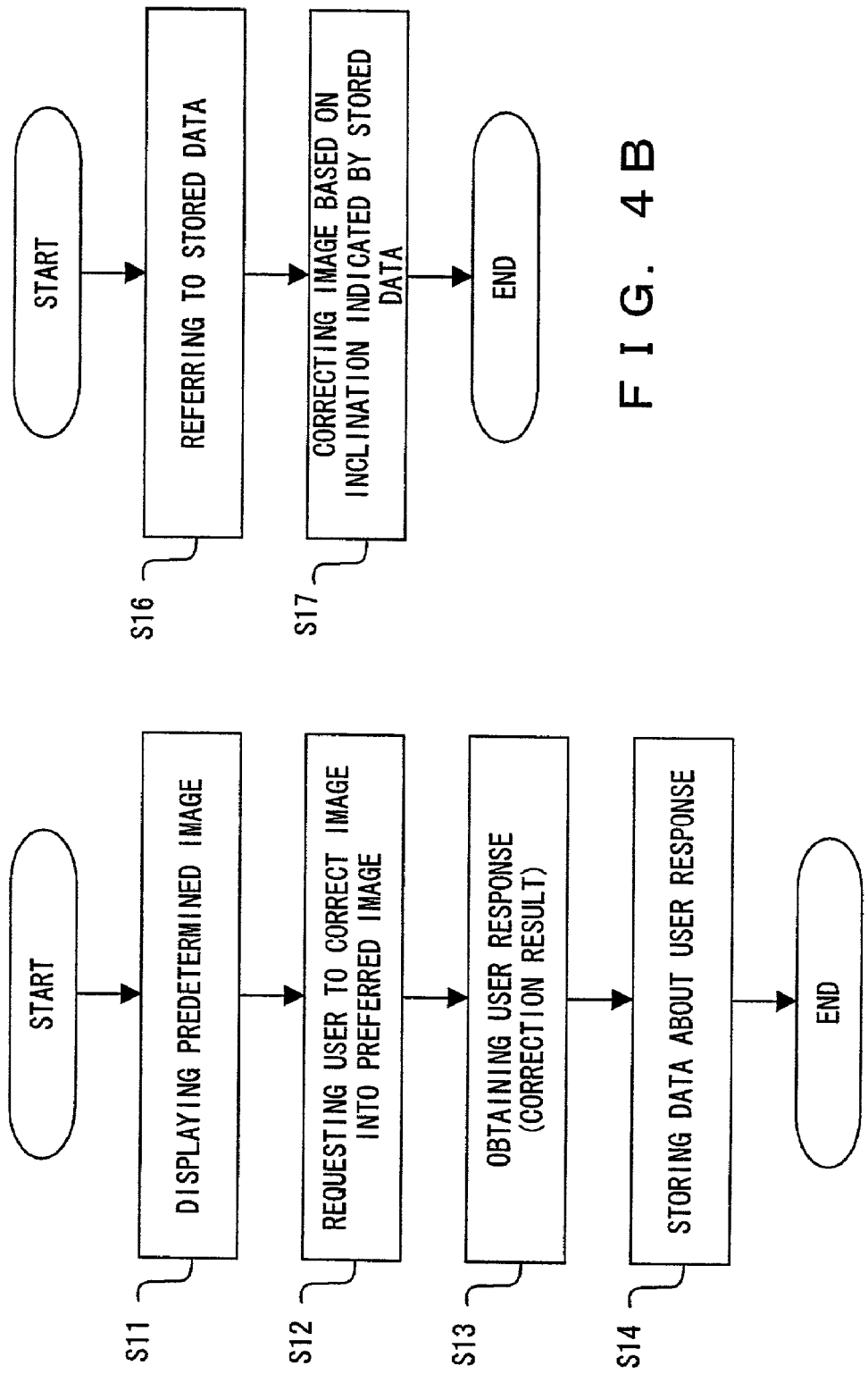

FIG. 6

| SEQUENCE A | IMAGE OF PERSON<br>BALANCE: REDDISH | IMAGE OF PERSON<br>BALANCE: LITTLE REDDISH | IMAGE OF PERSON<br>BALANCE: INTERMEDIATE | IMAGE OF PERSON<br>BALANCE: LITTLE BLUISH | IMAGE OF PERSON<br>BALANCE: BLUISH |
|---|---|---|---|---|---|
| | IMAGE 1 | IMAGE 2 | IMAGE 3 | IMAGE 4 | IMAGE 5 |
| SEQUENCE B | IMAGE OF PERSON<br>BRIGHTNESS: DARK | IMAGE OF PERSON<br>BRIGHTNESS: LITTLE DARK | IMAGE OF PERSON<br>BRIGHTNESS: INTERMEDIATE | IMAGE OF PERSON<br>BRIGHTNESS: LITTLE BRIGHT | IMAGE OF PERSON<br>BRIGHTNESS: BRIGHT |
| | IMAGE 1 | IMAGE 2 | IMAGE 3 | IMAGE 4 | IMAGE 5 |

| γ VALUE | BRIGHT | LITTLE BRIGHT | INTERMEDIATE | LITTLE DARK | DARK |
|---|---|---|---|---|---|
| | 0.8 | 0.9 | 1.1 | 1.25 | 1.4 |

FIG. 8

| α VALUE | BLUISH | LITTLE BLUISH | INTERMEDIATE | LITTLE REDDISH | REDDISH |
|---|---|---|---|---|---|
| | 9/10=0.90 | 10/10=1.00 | 10/9=1.11 | 10/8=1.25 | 10/7=1.43 |

SELECT PREFERRED IMAGE FROM EACH SEQUENCE IN PRINTED DATA.

SEQUENCE A　○ IMAGE 1　○ IMAGE 2　○ IMAGE 3　○ IMAGE 4　○ IMAGE 5

SEQUENCE B　○ IMAGE 1　○ IMAGE 2　○ IMAGE 3　○ IMAGE 4　○ IMAGE 5

SEQUENCE C　○ IMAGE 1　○ IMAGE 2　○ IMAGE 3　○ IMAGE 4　○ IMAGE 5

SEQUENCE D　○ IMAGE 1　○ IMAGE 2　○ IMAGE 3　○ IMAGE 4　○ IMAGE 5

INPUT USER NAME.

YOUR USER NAME :

| USER NAME | SEQUENCE A (PERSON, BALANCE) | SEQUENCE B (PERSON, BRIGHTNESS) | SEQUENCE C (LANDSCAPE, BALANCE) | SEQUENCE D (LANDSCAPE, BRIGHTNESS) |
|---|---|---|---|---|
| abc | 2.5 | 3 | 3 | 4 |
| abc_reddish | 1.5 | 3 | 2 | 4 |
| def | 3 | 3.5 | 4 | 4 |
| ghi | 3 | 4 | 4 | 3 |

F I G. 11

INPUT USER NAME.

YOUR USER NAME :

SPECIFY TYPE OF IMAGE (SUBJECT OF IMAGE) TO BE PRINTED.

○ PERSON    ○ LANDSCAPE    ○ OTHER, COMBINED, OR UNCERTAIN IMAGE

F I G. 1 3

| USER NAME | PERSON | LANDSCAPE | AVERAGE |
|---|---|---|---|
| abc | 1.05 | 1.05 | 1.08 |
| abc_reddish | 0.95 | 1.00 | 0.98 |
| def | 1.11 | 1.25 | 1.18 |
| ghi | 1.11 | 1.25 | 1.18 |

FIG. 14

| USER NAME | PERSON | LANDSCAPE | AVERAGE |
|---|---|---|---|
| abc | 1.1 | 1.25 | 1.18 |
| abc_reddish | 1.1 | 1.25 | 1.18 |
| def | 1.18 | 1.25 | 1.21 |
| ghi | 1.25 | 1.1 | 1.18 |

F I G. 1 5

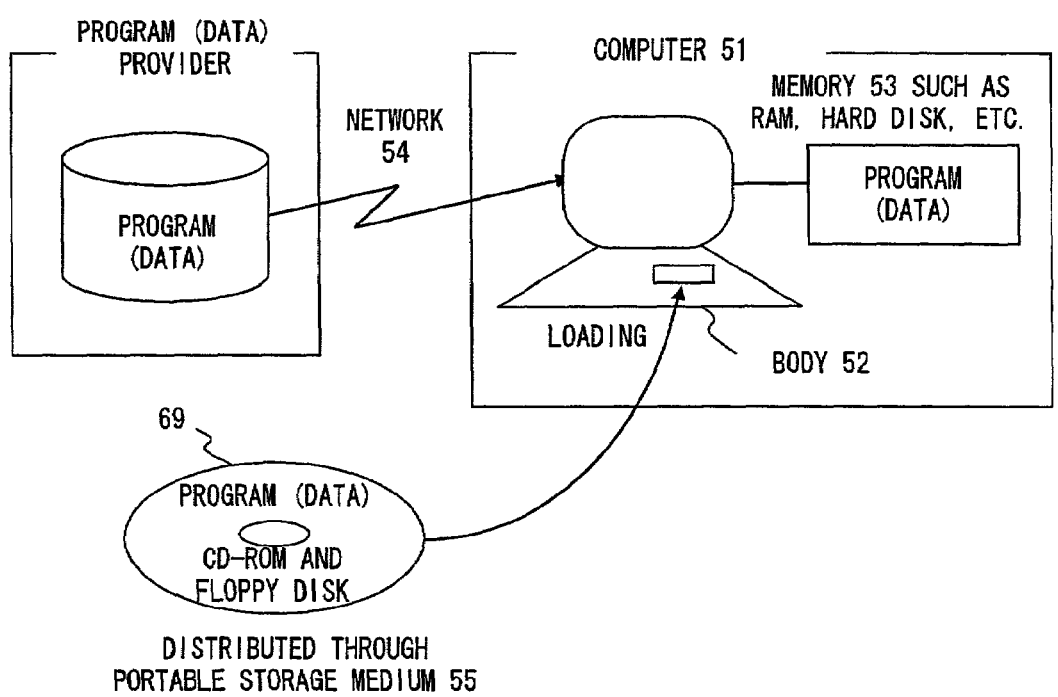
F I G. 20

IMAGE CORRECTION APPARATUS AND IMAGE CORRECTING METHOD

BACKGROUND OF THE INVENTION

1. Field of the Invention

The present invention relates to an image correction technology, and more specifically to an image correction apparatus and an image correcting method for correcting based on the preference of a user an image obtained by, for example, a digital camera, a color printer, etc. into a preferred image for the user.

2. Description of the Related Art

With an improvement in the performance of a computer, image-related appliances such a color printer, etc. have been widely used. Additionally, using a digital camera, a common user has a larger number of opportunities. However, the quality of a color image captured by a digital camera, etc. is not always satisfactory for a user. For example, images may be too dark, not bright, not clear, etc. Therefore, it is necessary to easily improve the quality of an image, for example, captured by a digital camera into a nice and satisfactory image for a user.

Thus, to correct an image into an image preferred by a user, it is necessary to assume that every user has his or her own preference of an image, and all users do not prefer the same image. For example, a user prefer a brighter image, but another user prefer a darker image. Therefore, in the image correction technology, the preference of each user is to be taken into account such that a satisfactory corrected image can be obtained for users.

The conventional technology of correcting an image with the preference of each user taken into account can be the software (Color Genius) provided by Dai-Nippon Screen Ltd. The catalog of a product describes the realization of the following three functions.

The first function is to automatically improve the quality of an image by software based on some keywords. The second function is to stores the difference between an image obtained by the automatic improvement and an corrected image obtained as a result of the correction made by a user. The third function is to make the difference between an automatically corrected image and the user corrected image be reflected in the automatic improvement in other images.

That is, in the conventional technology, the difference between the first preferred image obtained based on the preference of a user and the second preferred image obtained by automatically correcting an original image by software is stored, and the preference of a user is taken into account.

FIG. 1 shows the process of obtaining the preference of a user in the conventional technology. As shown in FIG. 1, when the process starts, a user sets an image to be corrected as an original image first in step S101, an corrected image is automatically generated from the original image in step S102, thereby obtaining an automatically corrected image. At this time, if the user difference information described later exists, then an corrected image is automatically generated with the information taken into account.

Then, in step S103, the user corrects the original image, thereby obtaining a user corrected image. Finally, in step S104, the difference between two images obtained in the steps S102 and S103, that is, the difference between the automatically corrected image and the user corrected image is stored in the system, and is reflected as user difference information in the automatic correction to an image other than the original image.

However, the above mentioned conventional technology has the following two problems.

The first problem refers to an intensive operation to be performed by a user. As described in step S103 shown in FIG. 1, it is necessary to generate an image preferred for a user as an corrected image corresponding to an original image. The correcting operation normally requires an intensive adjustment, thereby forcing a person poor in the knowledge of images to perform not only an intensive, but also a very hard operation.

The second problem is that, when an automatically corrected image obtained in step S102 shown in FIG. 1 is an appropriate image, a serious influence arises. That is, if a preferred image automatically generated by software is different from the preference of a common user, the difference between the wrong image, for example, an image too dark for the user, and a user corrected image is stored.

For example, if the user generates an corrected image at a brightness level of the preference of a common user, the difference obtained as a result of the adjustment made by the user for a brighter image is stored, thereby badly affecting the subsequent image corrections such that an image at a standard brightness level is corrected for a furthermore brighter image.

SUMMARY OF THE INVENTION

The present invention has been developed to solve the above mentioned problems, and aims at providing an image correction apparatus and an image correcting method for easing an operation to be performed by a user and suppressing an error when the quality of an image is automatically corrected by software.

A first image correction apparatus includes a user preference obtaining unit for outputting images at two or more correction levels as images obtained by correcting a given image, and allowing a user to select a preferred image, and an image correction unit for correcting an image to be corrected which is different from the given image according to the selection result of the user.

With the above mentioned first image correction apparatus, the user only has to select a preferred image from among a plurality of presented corrected images to register the preference of the user. Afterwards, the image correction unit automatically corrects an image to be corrected (any image which is different from the above mentioned given image) depending on the preference of the user.

A second image correction apparatus according to the present invention includes a user preference obtaining unit for outputting a predetermined image (generally preferred image), and allowing a user to correct the output image, and an image correction unit for correcting an image to be corrected different from the predetermined image according to the correction result of the user.

BRIEF DESCRIPTION OF THE DRAWINGS

FIGS. 4A and 4B are flowcharts of the entire process according to the second embodiment of the present invention;

FIG. 6 shows an example (1) of corrected images at a plurality of correction levels;

FIG. 8 shows the γ values of images at different brightness levels selected by 50 users;

FIG. 9 shows the α values of images with different white balances selected by 50 users;

FIG. 10 shows examples of screens displayed during the process of obtaining the preference of a user according to the first embodiment of the present invention;

FIG. 11 shows examples of the numbers of the images selected by users;

FIG. 13 shows an example of the screen displayed in the process of correcting an image;

FIG. 14 shows the α value indicating the user preference in white balance corresponding FIG. 11;

FIG. 15 shows the γ value of the brightness preferred by a user corresponding to FIG. 11;

FIG. 20 is the process of loading a printer into a computer according to the present invention.

DESCRIPTION OF THE PREFERRED EMBODIMENTS

Figure 1:
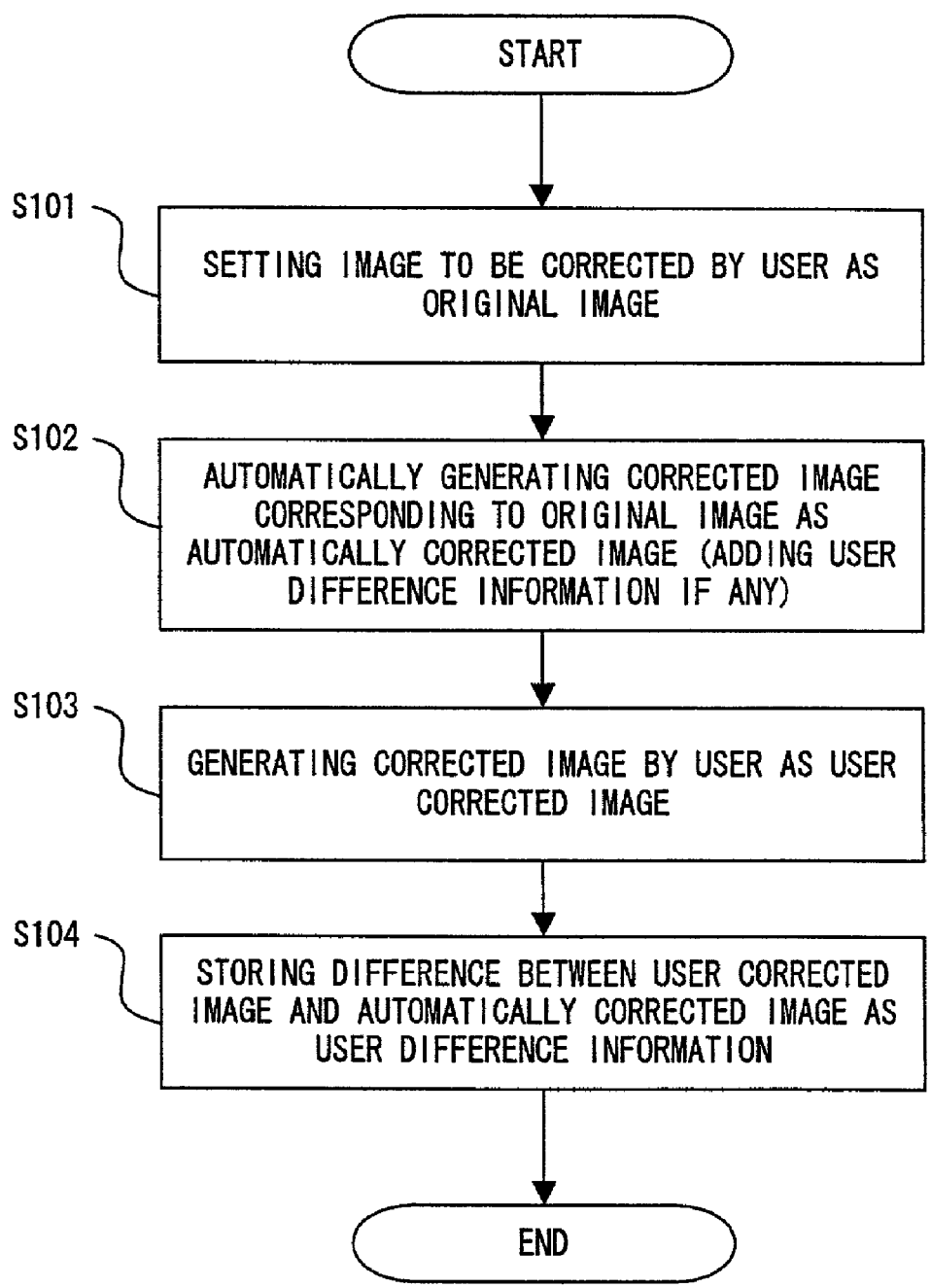
FIG. 1 is a flowchart of the process of the conventional image correction system.
Figures 2A, 2B:
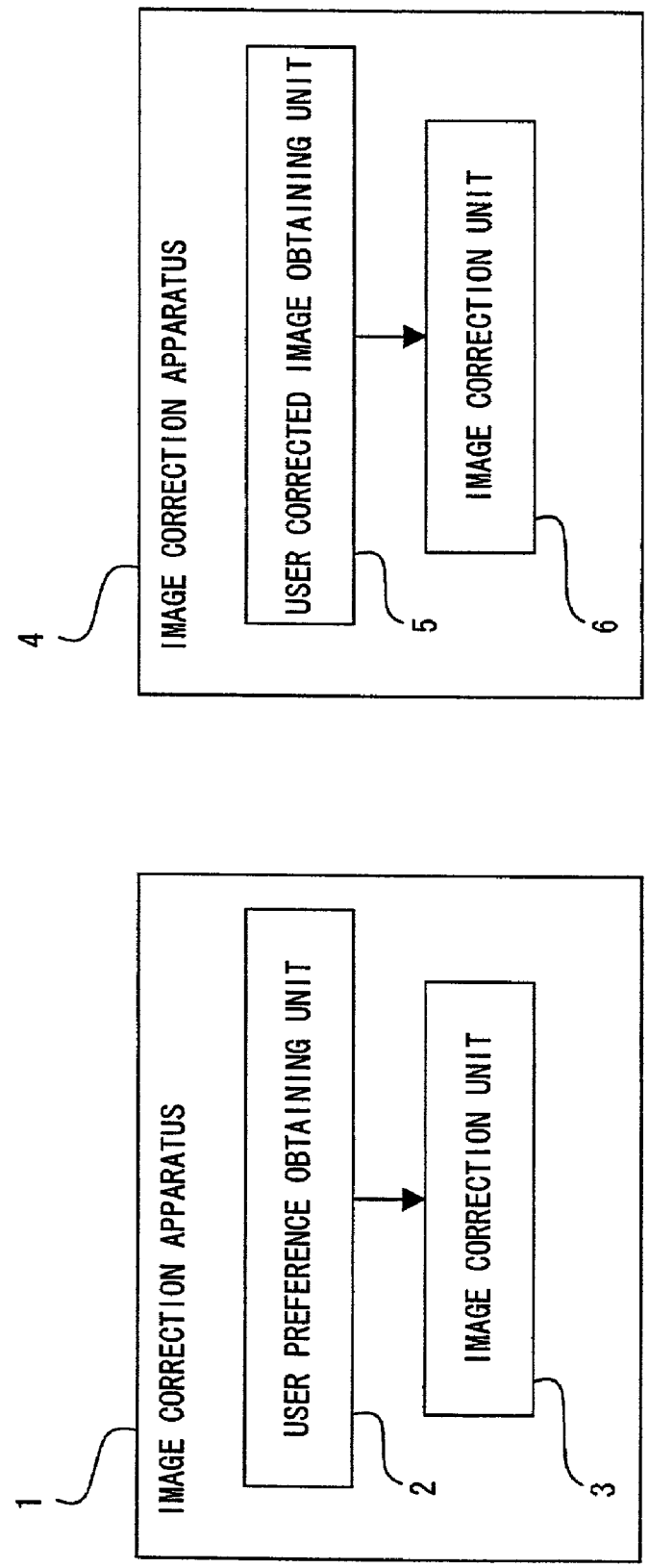
FIGS. 2A and 2B are block diagrams of the configuration showing the principle of the image correction apparatus according to the present invention.

FIGS. 2A and 2B are block diagrams of the configuration showing the principle of the present invention. FIGS. 2A and 2B are block diagrams showing the principle of the image correction apparatus for correcting an image according to the preference of a user. FIG. 2A corresponds to the first embodiment, and FIG. 2B corresponds to the second embodiment of the present invention.

In FIG. 2A, an image correction apparatus 1 comprises a user preference obtaining unit 2 and an image correction unit 3. The user preference obtaining unit 2 outputs images at two or more correction levels, for example, at five correction levels, as corrected images corresponding to a given image, for example, a predetermined image from the user or the system, and allows the user to select a preferred corrected image, for example, one or more corrected images.

The image correction unit 3 computes the difference in brightness, white balance, etc. between a given image and a selected image corresponding to a selection result of a user, that is, a user-preferred corrected image, and corrects an image to be corrected which is different from the given image using the difference.

The above mentioned given image is not limited to one image. That is, images at two or more correction levels are output corresponding to a plurality of given images so that the user can select an corrected image for each of the given images. Furthermore, the plurality of given images can be different types of images such as an image of a person and an image of a landscape, etc. Corresponding to these different types of given images, the user preference obtaining unit 2 outputs images at two or more correction levels for each of the given images to allow the user to select a preferred corrected image for each of the types. The image correction unit 3 can prompt the user for an input for each type when an image to be corrected is actually corrected.

Furthermore, for example, the user preference obtaining unit 2 can request the user to input a user identifier, and the image correction unit 3 can correct an image to be corrected in response to the value of the user identifier.

Additionally, for example, when the user preference obtaining unit 2 outputs images at more than two correction levels as corrected images, and the images can be output as printing results from, for example, a printer instead of displaying the images on a display screen.

In FIG. 2B, an image correction unit 4 comprises a user corrected image obtaining unit 5 and an image correction unit 6. The user corrected image obtaining unit 5 outputs a predetermined image, for example, a generally preferred image both in brightness and white balance obtained by a system designer checking the preference of fifty general persons, and allows a user to correct the output image.

In response to the correction result of the user, the image correction unit 6 computes the difference in brightness and white balance from the predetermined image as the image correction unit 3 shown in FIG. 2A, and corrects an image to be corrected which is different from a predetermined image based on the difference.

As described above, the image correction unit 4 outputs a plurality of images as predetermined images, and allows a user to make an correction to each of the images. The plurality of images can be of different types, and when an image to be corrected which is different from the predetermined images is corrected, a user can be prompted to input an image for each type.

For example, as described above, the user corrected image obtaining unit 5 can request a user to input a user identifier for identification of a user, and the image correction unit 6 can correct an image to be corrected corresponding to the identifier.

Furthermore, the user corrected image obtaining unit 5 can have the above mentioned predetermined image or/and a user corrected image for the image printed at an instruction of the user, and can obtain the most preferred image for the user in the printed results.

Then, in the image correcting method according to the present invention, images at two or more correction levels are output as corrected images for a given image in correcting an image based on the preference of a user, and the user selects a preferred corrected image. Then, in response to the selection result of the user, an image to be corrected which is different from the given image is corrected.

In another method of correcting an image based on the preference of a user, a predetermined image is output, and a user makes an correction to the output image. Then, in response to the correction result of the user, an image to be corrected which is different from the predetermined image is corrected.

Furthermore, according to the present invention, a computer-readable portable storage medium stores a program used to direct a computer to perform the steps of outputting a predetermined image, allowing a user to correct the output image, and making an correction to an image to be corrected which is different from the predetermined image in response to the correction result of the user.

As described above, according to the present invention, images at two or more correction levels are output as corrected images for a given image, and a user is allowed to select a preferred corrected image, or a predetermined image (a generally preferred image) is output, and a user is allowed to make an correction to the output image, thereby honoring the preference of the user.

Figure 3B:
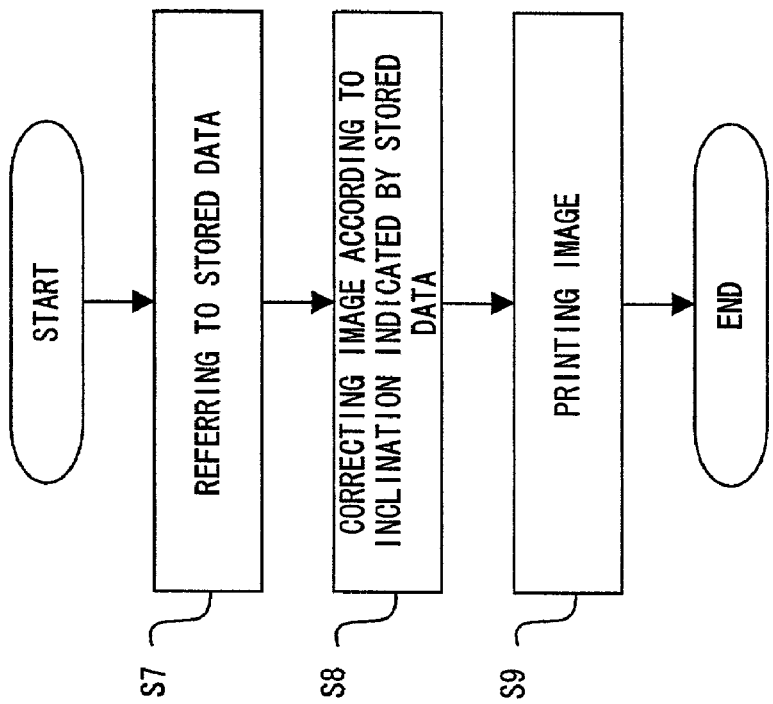
FIGS. 3A and 3B are flowcharts of the entire process according to the first embodiment of the present invention.
Figure 3A:
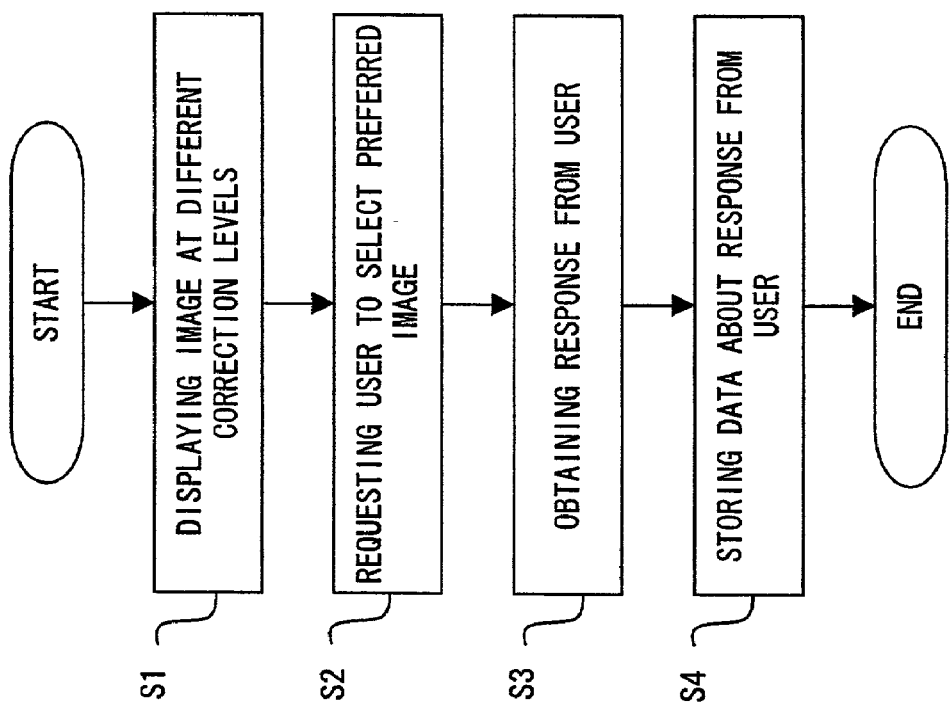

FIGS. 3A and 3B are flowcharts of the entire process corresponding to the first embodiment of the present invention described later. FIG. 3A is a flowchart of the process of obtaining the preference of a user corresponding to the preprocess for correcting an actual image which the user request to be corrected. When the process starts in FIG. 3A, a plurality of corrected images at different correction levels are displayed for a given image (for example, an image given by a user, or an image predetermined by the system) in step S1, and a user is requested to select a preferred corrected image in step S2.

In step S3, the selection result of the user, that is, a response, is obtained. In step S4, in response to the input from the user, the data for actual correction of an image to be corrected (for example, the data of the difference between the above mentioned given image and a user-selected corrected image in brightness and white balance) is stored, thereby terminating the process.

FIG. 3B is a flowchart of the process of actually correcting an image to be corrected using the data obtained in the process of obtaining the preference of the user. In FIG. 3B, when the process starts, the stored data (data of the difference between the above mentioned given image and the user-selected corrected image in brightness and white balance) is referred to in step S7, an image to be corrected is corrected based on the inclination indicated by the data in step S8, and an image of the correction result is printed in step S9, thereby terminating the process.

The image is printed in step S9 as a process in which a printer is used, and the user can easily confirm that an image is appropriately corrected by receiving a final correction result as printout. If no printers are used, the correction result is displayed on, for example, a display.

In the process of correcting an image in step S8, an correction is first made to an image to be corrected into a generally preferred image, and then made based on the preference of a user. The technology of correcting an image to be corrected into a generally preferred image can be the method described in the following document 1 relating to brightness, for example.

Document 1: Juha Katajimaki and Pekka Laihanen, "Image Dependent Gamma Selection Based on Color Palette Equalization and a Simple Lightness Model" Proc. of 7th CIC, 301-306 (1999)

In this method, an image to be corrected is analyzed, an index coefficient referred to as a γ value is computed, and an image is corrected using the coefficient. The γ value is described in the following document 2. The technology is furthermore described later.

Document 2: R. W. G. Hunt, "The Reproduction of Colour" p.455, Fountain Press, ISBN-0-86343-381-2

If a printer is used when a plurality of corrected images at different correction levels are output in step S1 shown in FIG. 3A, it is more effective to output an corrected image as a printed result and obtain the preference of a user. On the printer, a finally output printed result is important, and the preference of a user can be correctly obtained based on the printed result when the user selects a preferred image.

FIGS. 4A and 4B are flowcharts of the entire process according to the second embodiment of the present invention.

FIG. 4A is a flowchart of the preprocess for obtaining the preference of a user. When the process starts, a predetermined image is displayed in step S11. As a displayed image, for example, an image at a generally preferred brightness level is prepared and used. An image at a generally preferred level can be obtained by having a larger number of general persons (users) evaluate images at different brightness levels.

In step S12, a user is requested to correct a displayed image for a more preferable image. In this correction, for example, a slider is prepared to ease an operation of a user, and the slider is operated by the user. Using the slider, the user can correct an image by changing the brightness or the white balance of the image. As necessary, correction results are printed and output to correctly obtain the preference of the user.

The correction result of the user is obtained as an answer in step S13, and the data for correction of an image to be corrected is stored in response to the answer from the result in step S14, thereby terminating the process.

An image displayed in step S11 can be, for example, a brighter image instead of an image at a generally preferred brightness level. In this case, if the image is the same as the image displayed as the correction result of a user, the user prefers a brighter image.

In FIG. 4B, as in FIG. 3B, an image to be corrected, which is not used in the process of obtaining the preference of a user, is corrected. It is obvious that the image can be printed after the image is corrected in step S17.

Described below is an correction to an image using a printer as the first embodiment of the present invention.

A printer is generally used by connection to a personal computer, and a printing operation is performed according to a control signal generated by the printer driver software installed in the personal computer. The present invention relates to, for example, the printer driver software, but does not directly relate to the configuration of a printer. Therefore, the configuration of the printer is omitted here, but the configuration is generally the same as a common printer.

Printer driver software is delivered, for example, as attached to a printer, provided for a printer user, and installed in a personal computer by the printer user. The apparatus performs the processes of obtaining the preference of a user as described by referring to FIGS. 3A and 3B, and correcting an image to be corrected based on the obtained preference of the user. These processes are described below furthermore in detail.

In the printer device according to the first embodiment of the present invention, the process of obtaining the preference of a user is first performed, the data of the preference of the user is registered in the system, and an image is printed based on the registered data when an image is printed, that is, when an image to be corrected is actually corrected. Basically, the data of the preference of a user is to be registered only once in the system, and the registering operation is not hard for a user.

For example, the process of obtaining the preference of a user can be performed simultaneously with the process of installing the printer driver software in a personal computer. In this installing operation, a user has to determine whether or not various settings and license can be permitted, etc. By collectively performing the operations and the process of obtaining the preference of a user, the load for the user both in mentality and time can be reduced.

However, it is desired that the process of obtaining the preference of a user can be performed at any time other than an installing period. For example, when a new user is added, when data is to be changed relating to the registered preference of a user, it is desired that the process of obtaining the preference of a user can be performed at any timing other than an installing period.

The process of correcting an image to be corrected based on the obtained preference of user is activated when the user has an image printed. When an image is printed, the process can be unconditionally activated, or the user can select the activation/non-activation of the process.

Figure 5:
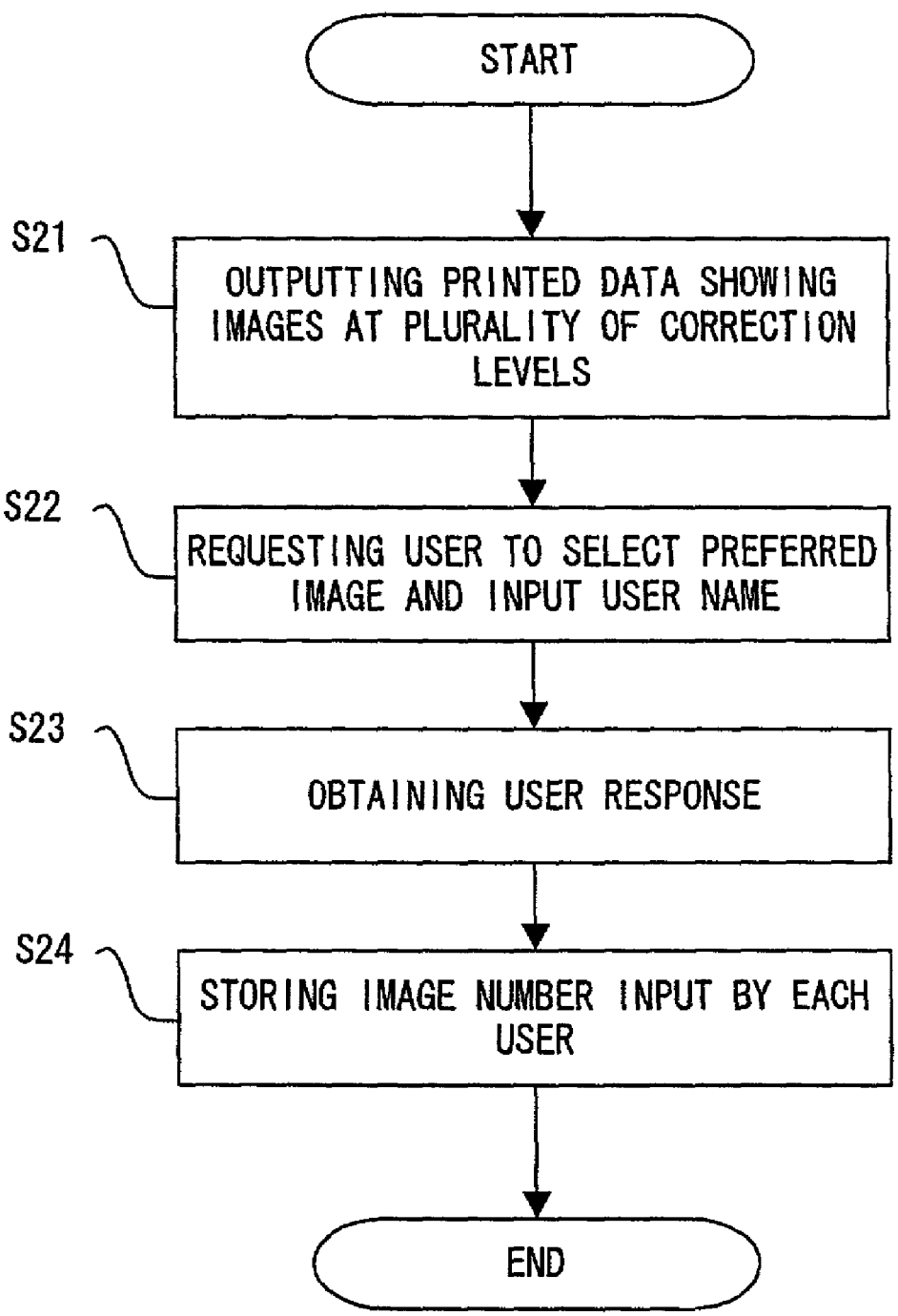
FIG. 5 is a flowchart of the process of obtaining the preference of a user according to the first embodiment.

FIG. 5 is a flowchart of the process of obtaining the preference of a user according to the first embodiment of the present invention. In FIG. 5, when the process starts, a plurality of corrected images at different correction levels are printed for an image given in step S21. The given image can be obtained from the user, or predetermined by a system designer. Generally, two types of images, that is, an image of a person and an image of a landscape, are used as given images. An corrected image obtained by changing the white balance, and an corrected image obtained by changing the brightness are printed and output for each type.

Figure 7:
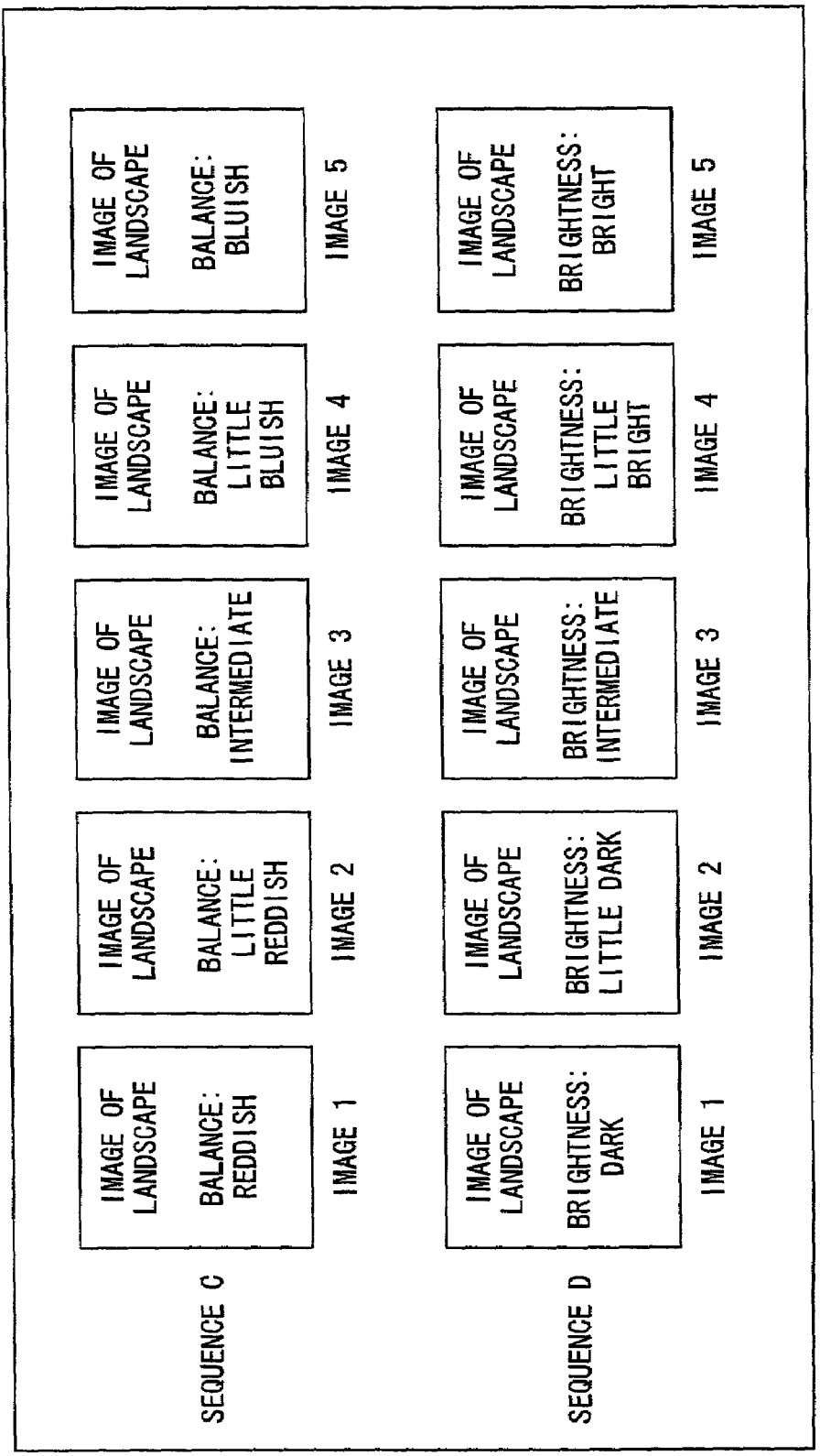
FIG. 7 shows an example (2) of corrected images at a plurality of correction levels.

FIGS. 6 and 7 show examples of the output corrected images. In FIG. 5, the sequence A is output after the white balance of the image of a person has been changed, and the sequence B is output after the brightness of the image of a person has been changed. FIG. 7 shows an example of similar output for the image of a landscape.

The types of a given image is not limited to two types, that is, an image of a person and an image of a landscape. For example, other types such as a metallic object, etc. can be added. Otherwise, for example, only one type can be used. That is, an image of a male a female, or images of persons with quite different backgrounds can be used.

In this embodiment, given images and corrected images at different brightness and white balance levels are prepared by the system designer. Corrected images at different brightness levels are generated in the following procedure. The procedure is only an example, and is not limited to this application.

1. About ten images at different brightness levels are generated from an original image.

The brightness of an image can be changed by, for example, changing the RGB value of each pixel by an exponential (refer to the following transform). In this example, (R, G, B) indicates the pixel level of an image obtained by normalizing an original image between 0 and 1, and (Rnew, Gnew, Bnew) indicates the pixel level of an corrected image obtained by normalization between 0 and 1. In the following explanation, the RGB pixel value can be the minimum value of 0 and the maximum value of 1.

$$R_{new}=R^\gamma, G_{new}=G^\gamma, B_{new}=B^\gamma$$

For example, an corrected image is generated by the equation above using the ten values of $\gamma$=0.6, 0.7, 0.8, 0.9, 1.0, 1.1, 1.25, 1.4, 1.6, and 1.8.

2. Five types of images are selected from among the generated images described above.

For example, inquire 50 observers which is the most preferable in the above mentioned images, and the following image is selected.

- an image corresponding to the $\gamma$ value indicating the peak in the preferred distribution of the $\gamma$ values, or a weighted average value (an average $\gamma$ value weighted by the number of persons)
- an image corresponding to $\pm 1.5\sigma$ and $\pm 3\sigma$ with the preferred distribution of the $\gamma$ values as a normalized distribution of the standard deviation $\sigma$ When there is no image which an observer considers appropriate in the above mentioned range of the $\gamma$ value, the range of the $\gamma$ value is appropriately changed (by extending the range) to proceed with the check. In this procedure, a brighter image ($-3\sigma$), a little bright image ($-1.5\sigma$), an image at a generally preferred bright level, a little dark image ($+1.5\sigma$), and a dark image ($+3\sigma$) as shown in FIG. 8 are selected.

For example, images with different white balances can be generated, for example, in the following procedure. The following procedure is an example, but is not limited to this example.

1. About ten images with different white balances are generated from an original image.

The white balance of an image can be changed by, for example, changing the RGB value of each pixel by the following transform. In this example, (R, G, B) indicates the pixel value of an image obtained by normalizing an original image between 0 and 1, and (Rnew, Gnew, Bnew) indicates the pixel value of an corrected image obtained by normalization between 0 and 1.

$$Rnew=\alpha R, Gnew=G, Bnew=(1/\alpha)B,$$

When a result exceeds 1, the value is set to 1.

For example, an corrected image is generated by the equation above using the eleven values of $\alpha$=5/10, 6/10, 7/10, 8/10, 9/10, 10/10, 10/9, 10/8, 10/7, 10/6, and 10/5.

2. Five types of images are selected from among the generated images described above.

For example, inquire 50 observers which is the most preferable in the above mentioned images, and the following image is selected.

- an image corresponding to the $\alpha$ value indicating the peak in the preferred distribution of the $\alpha$ values, or a weighted average value
- an image corresponding to $\pm 1.5\sigma$ and $\pm 3\sigma$ with the preferred distribution of the $\alpha$ values as a normalized distribution of the standard deviation $\sigma$ When there is no image which an observer considers appropriate in the above mentioned range of the $\alpha$ value, the range of the $\alpha$ value is appropriately changed (by extending the range) to proceed with the check. In this procedure, a bluish image ($-3\sigma$), a little bluish image, an image at a generally preferred white balance, a little reddish image, and a reddish image as shown in FIG. 9 are selected.

Back in FIG. 5, a user is requested to select a preferred corrected image, and input the name of the user in step S22. FIG. 10 shows an example of the request screen. The user is requested to select a user-preferred image from the printout output in step S21, that is, in each sequence of corrected images shown in FIGS. 6 and 7, and to input the name of the user. If the user has a plurality of preferred images, he or she can select the plurality of images. In FIG. 10, the number of image is selected using the button, but an intermediate value can be selected using the slider. It is obvious that an identifier for identification of a user can be input instead of the name of the user in step S22.

Thus, the answer of the user is obtained in step S23 shown in FIG. 5, and the selection result is stored in step S24, that is, the number of the image selected by the user is stored for each user, thereby terminating the process. If a plurality of images are selected, an average value of the numbers can be stored. Furthermore, the $\gamma$ and $\alpha$ values corresponding to the number of images can also be stored.

Since the preference of a user depends on each user, it is desired that the name of a user is input as shown in FIG. 10 for management of the selection result for each user. If a user operating a printer driver is limited to one person, then it is not necessary to always input the name of a user.

For example, if one user can make different corrections in different patterns, then the user can be allowed to register a plurality of user names. For example, if there are a number of images taken by a digital still camera with incandescent light, and the user requests to print the images with reddish white balance with the color of the incandescent light, then the user selects an image with a reddish white balance, and registers it with a different name of the user. Practically, for example, when a user 'abc' registers his or her name, the name 'abc' is registered for registration of his or her normally preferred image. However, if the user selects a reddish image, it is registered with the user name 'abc_reddish'.

Although FIG. 10 displays only an input box for a user name, an input box for input of further information can be displayed such that each user can be distinguished depending on the purpose such as the purpose of printing an image as described above.

In the above mentioned procedure, the preference of a user for an image of a person and an image of a landscape can be obtained. The obtained data is stored for each user name and sequence. FIG. 11 shows an example of stored data.

Figure 12:
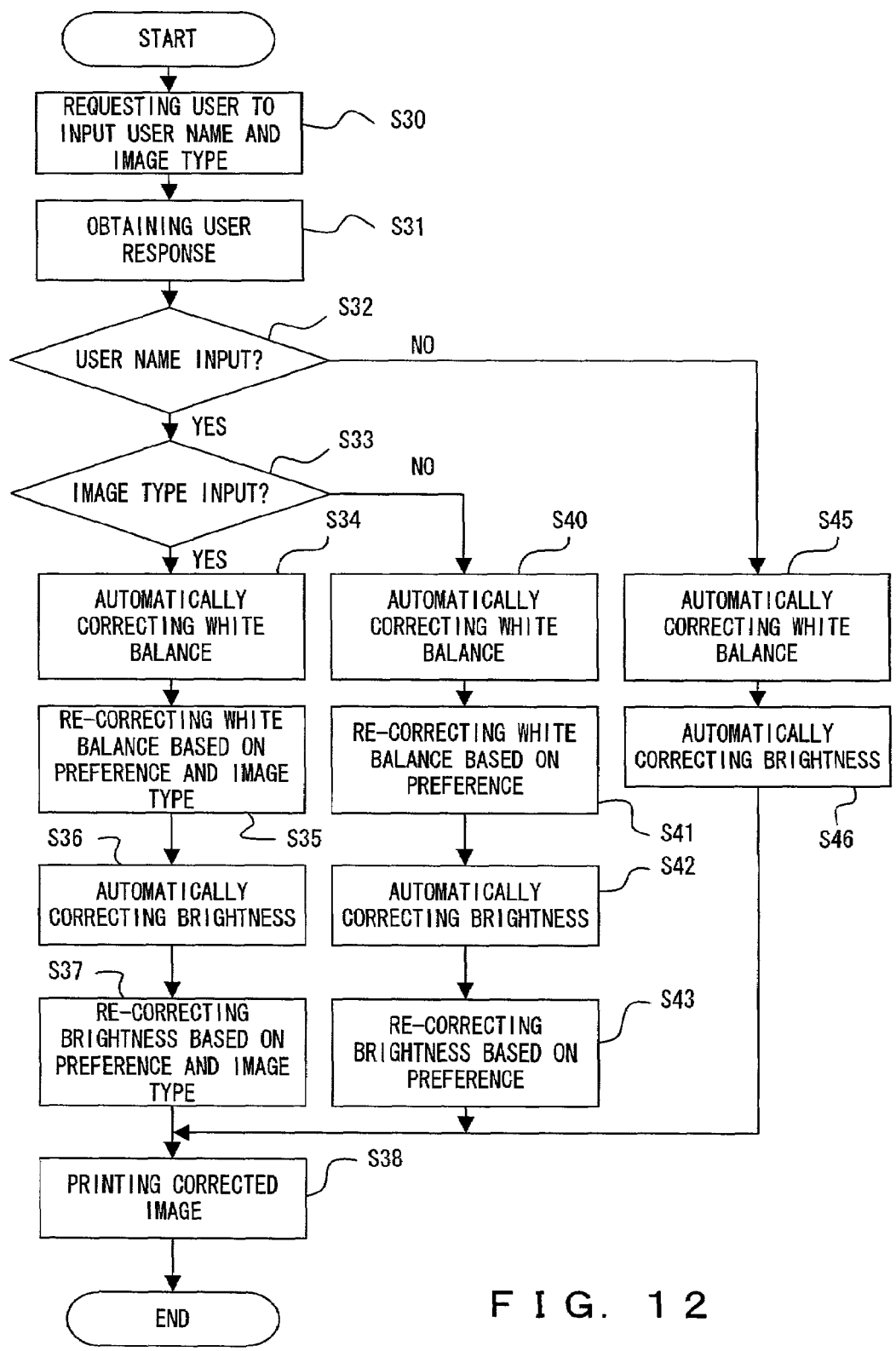
FIG. 12 is a detailed flowchart of the process of correcting an image with the preference of a user taken into account according to the first embodiment of the present invention.

FIG. 12 is a detailed flowchart of the process of correcting the subsequent images, that is, images to be corrected based on the obtained preference of a user according to the first embodiment of the present invention. In FIG. 12, when the process starts, the user is requested to input the name of a user and the type of an image in step S30.

FIG. 13 shows an example of the input request screen. The screen is displayed to prompt a user to input the name of the user, an image to be printed, that is, the type of an image to be corrected, that is, whether the subject of an image to be corrected is a person, a landscape, or other, combined, or uncertain image.

An answer of the user in response to the request is obtained in step S31 shown in FIG. 12, and the image is corrected in response to the answer. If the name of user is not set or if the name does not match the registered name of the user, then the preference of the user cannot be reflected. Therefore, according to the present embodiment, an automatic correction is made to an image into a generally preferred image. The automatic correction is described later. In the printer system in which the number of users is limited to one, an image can be corrected based on the preference of a user although the name of the user is not set.

When both uses name and image type are specified, an automatic correction is first made to an image into a generally preferred image, and then an correction is made based on the preference of the user corresponding to the type of the image. If only the name of a user is specified, then an automatic correction is made to an image into a generally preferred image, and the image is corrected without considering the type of the image based on the preference of the user.

It is determined in step S32 whether or not the name of a user has been input. If it has been input, then it is determined in step S33 whether or not the type of the image has been input.

First described below is the process of correcting an image when both user name and image type have been input as the most characteristic example according to the present invention. Then, it is determined in step S33 that the type of the image has been input, and an automatic correction relating to the white balance is made in step S34. The automatic correction is made to an image to be corrected into an image with the value of a generally preferred white balance. One of the methods is described below as an example. However, it is obvious that the present invention is not limited to this application.

As a determination reference of white balance in automatically correcting the white balance in step S34, the reference (Evans' principle) described on page 80 of the document 2 is used. According to the determination reference, the status of preferred white balance is an average value of the entire color referring to an achromatic color.

Practically, an correction is made by the following equations where x and y respectively indicate the numbers of the pixels in the horizontal and vertical directions, and i and j respectively indicate the coordinates of a pixel ($0 \leq i \leq x-1$, $0 \leq j \leq y-1$). Rij, Gij, and Bij indicate the RGB values of the pixels of the coordinates indicated by i and j respectively, and R1ij, G1ij, and B1ij indicate the RGB values after the correction.

$$r_b = \frac{\sum_{j=0}^{y-1}\sum_{i=0}^{x-1} R_{ij} + \sum_{j=0}^{y-1}\sum_{i=0}^{x-1} G_{ij} + \sum_{j=0}^{y-1}\sum_{i=0}^{x-1} B_{ij}}{3\sum_{j=o}^{y-1}\sum_{i=0}^{x-1} R_{ij}}$$

$$g_b = \frac{\sum_{j=0}^{y-1}\sum_{i=0}^{x-1} R_{ij} + \sum_{j=0}^{y-1}\sum_{i=0}^{x-1} G_{ij} + \sum_{j=0}^{y-1}\sum_{i=0}^{x-1} B_{ij}}{3\sum_{j=o}^{y-1}\sum_{i=0}^{x-1} G_{ij}}$$

$$b_b = \frac{\sum_{j=0}^{y-1}\sum_{i=0}^{x-1} R_{ij} + \sum_{j=0}^{y-1}\sum_{i=0}^{x-1} G_{ij} + \sum_{j=0}^{y-1}\sum_{i=0}^{x-1} B_{ij}}{3\sum_{j=o}^{y-1}\sum_{i=0}^{x-1} B_{ij}}$$

$R1_{ij}=r_b R_{ij} (\text{if} R1_{ij}>1 \text{then} R1_{ij}=1)$ $G1_{ij}=g_b G_{ij} (\text{if} G1_{ij}>1 \text{then} G1_{ij}=1)$ $B1_{ij}=r_b B_{ij} (\text{if} B1_{ij}>1 \text{then} B1_{ij}=1)$ When the automatic correction terminates in step S34, the white balance is corrected again based on the preference of the user and the type of the image in step S35. In this re-correction, the white balance is basically re-arranged corresponding to the number of the image selected by the user as shown in FIG. 11.

FIG. 14 shows the value of α of the image selected by a user by referring to FIG. 11. In step S35, the white balance is corrected by the following equations using the value of α corresponding to the user name and the type of the image.

$R2_{ij}=\alpha R1_{ij}$, $G2_{ij}=G1_{ij}$, $B2_{ij}=(1/\alpha)B1_{ij}$, if$R2_{ij}>1$then
$R2_{ij}=1$, if$B2_{ij}>1$then $B2_{ij}=1$ where i and j indicate the coordinates of the pixel, R1ij, G1ij, and B1ij are the values of RBG for the pixel indicated by the coordinates of i and obtained after performing the process in step S34, and R2ij, G2ij, and B2ij are the values of RGB after performing the process in step S35.

In step S36 shown in FIG. 12, an automatic correction in brightness is made. The technology of an automatic correction is described in the above mentioned document 1. As described above, in this system, an image to be corrected is analyzed to compute an index coefficient referred to as a γ value, an correction is made such that the computed γ value can match the γ value of the output system, for example, the γ value of the Braun tube used as a display to generate an image at a generally preferred brightness level. That is, assuming that the γ value obtained by analyzing the image to be corrected is γ opt, and the γ value of the output system is γ out, an correction is made by the following equations $$R3_{ij}=R2_{ij}^{(\gamma out/\gamma opt)}$$

$$G3_{ij}=G2_{ij}^{(\gamma out/\gamma opt)}$$

$$B3_{ij}=B2_{ij}^{(\gamma out/\gamma opt)}$$

where R2ij, G2ij, and B2ij are the values of RGB after performing the process in step S35 on the pixel indicated by the coordinates i and j, and R3ij, G3ij, and B3ij are the values of RGB after performing the process in step S36 on the pixel indicated by the coordinates i and j.

When the process terminates in step S36, an correction is made again for the brightness of the image to be corrected based on the preference of the user and the type of the image in step S37. As in the re-correction for the white balance in step S35, the re-correction is made corresponding to the number of the image selected by the user as described by referring to FIG. 11.

FIG. 15 shows the γ value as the preference of the user corresponding to the number of the image shown in FIG. 11. In step S37, the brightness is re-corrected by the following equation using the user name and the γ value corresponding to the type of the image.

$$R4_{ij}=R3_{ij}^{\gamma},\ G4ij=G3_{ij}^{\gamma},\ B4_{ij}=B3_{ij}^{\gamma}$$

where i and j indicate the coordinates of the pixel, R3ij, G3ij, and B3ij are the values of RGB for the pixel indicated by the coordinates of i and j obtained after performing the process in step S36, and R4ij, G4ij, and B4ij are the values of RGB after performing the process in step S37.

Finally, the corrected image is printed in step S38, thereby terminating the process. Thus, the image is corrected by reflecting the preference of a user, and the user can have a preferred image printed. In the process of obtaining the preference of the user, the user only selects a preferred image from among printed images, thereby considerably easing the operation of the user as compared with the conventional technology.

If it is determined that the user has not input the type of the image in step S33 shown in FIG. 12, the processes in steps S40 through S43 are performed instead of the processes in steps S34 through S37. The process of automatically correcting the white balance in step S40 is the same as the process in step S34, and the process of automatically correcting the brightness in step S42 is the same as the process in step S36.

Since the user has not input the type of the image in the process of re-correcting the white balance in step S41, an average value corresponding to the user name is used based on the value of α shown in FIG. 14, and the re-correcting process is performed as in step S35. In step S43, the brightness is re-corrected as in step S37 using the average value corresponding to the user name from the value of γ shown in FIG. 15.

If the user name is not input in step S32 shown in FIG. 12, then the processes shown in steps S45 and S46 are performed as the process of correcting an image to be corrected. These processes are the same as the process of automatically correcting the white balance in step S34, and the process of automatically correcting the brightness in step S36. Since no user name or no type of image is specified, only the white balance and the bright name are automatically corrected using the above mentioned two automatically correcting technology. When the brightness is automatically corrected, R1ij, G1ij, and B1ij are used as the RGB of the pixel after automatically correcting the white balance instead of R2ij, G2ij, and B2ij as the RGB value of the above mentioned pixel.

According to the above mentioned first embodiment of the present invention, the preference of a user is obtained based on the image give by a system designer. Therefore, the preference of the user can be obtained with higher precision than according to the conventional technology because the general preference obtained from the evaluation of, for example, 50 users is compared with the preference of the user. For a further precise result, the number of users can be increased for the checking the general preference.

As an image given as described above, an image obtained from the user can be used instead of the predetermined image obtained from the system designer. In this case, the above mentioned automatically correcting method is used on the image given by a user, that is, the white balance is automatically corrected in step S34 shown in FIG. 12, the brightness is automatically corrected in step S36, thereby generating a generally preferred image, the values of γ and α are changed by, for example, a predetermined value, thereby generating an image more reddish, bluish, brighter, or darker than a generally preferred image, and the obtained image can be used instead of the image shown in FIGS. 6 and 7.

In this case, the precision of the obtained preference of the user is generally low, but the storage area of images in the system can be smaller. However, the feature that the operation of the user can be easier than in the conventional technology can be guaranteed. In this case, if a user performs the process of obtaining the preference of a user based on an image of a person in which the user takes interest, the preference of the user can be obtained with high precision because, in the process of correcting an image to be corrected with the preference of the user taken into account, the image of the person in which the user takes interest is possibly an image to be corrected.

Described below is the second embodiment of the present invention. According to the second embodiment, one image predetermined by the system is displayed to allow a user to correct the image, and obtain the preference of the user while, according to the first embodiment of the present invention, images at different correction levels are displayed for a given image to allow a user to select a preferred image.

Therefore, according to the second embodiment, an image is displayed on the display screen as a user interface to allow a user to correct the image. It is also possible to realize an image correcting software. When a printed result of a user-corrected image is to be confirmed, a printer system can be realized if a trial printout function can be included.

In any way, as in the first embodiment of the present invention, the process of obtaining the preference of a user and the process of correcting an image to be corrected are performed according to the second embodiment.

According to the second embodiment of the present invention, the preference of a user is first obtained, and an image to be corrected is corrected using the data relating to the preference. The data about the preference is basically registered only once, and the registering operation is not hard for the user.

As in the first embodiment of the present invention, the process of obtaining the preference of a user can be performed when software is installed. However, it is desired that the process of obtaining the preference of a user can be performed at any timing other than in the installing process.

The process of correcting an image to be corrected with the preference of a user taken into account is activated when the user corrects an image as in the first embodiment of the present invention. When an image is printed in a printer system, the process can be set to be unconditionally activated, and the user can select the activation.

Figure 16:
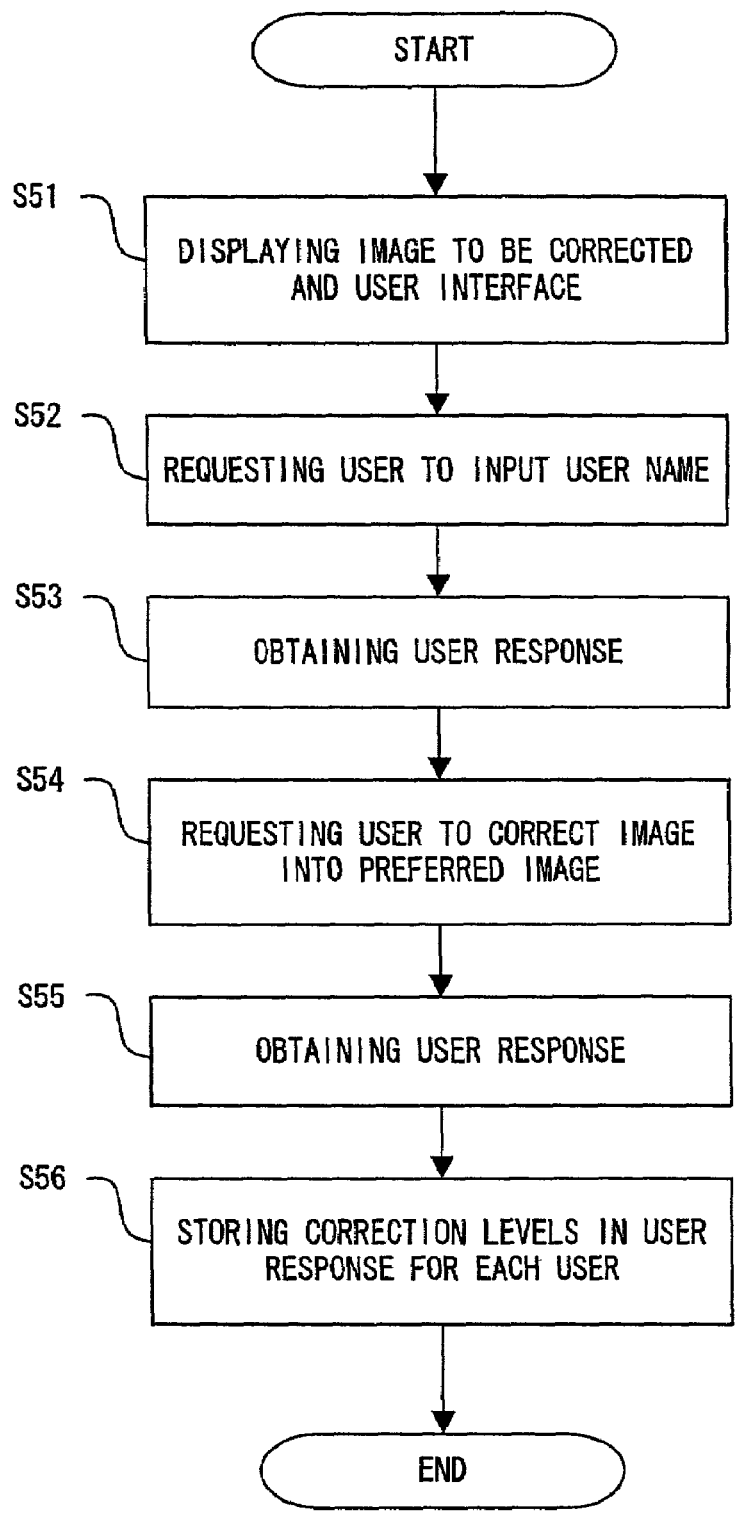
FIG. 16 is a flowchart of the process of obtaining the preference of a user according to the second embodiment of the present invention.

FIG. 16 is a flowchart of the process of obtaining the preference of a user according to the second embodiment of the present invention. In FIG. 16, when the process starts, an image to be corrected and a user interface are displayed in step S51. In step S52, the user is prompted to input a user name (or a user identifier). In step S53, the user name is input, that is, a response is obtained from the user.

Then, in step S54, the user is requested to correct the image to be corrected into a preferred image. In step S55, an correction result, that is, a response from the user, is obtained. In step S56, in response to the correction result of the user, the values of α and γ indicating the correction levels of the white balance and the brightness are stored for each user, thereby terminating the process.

It is desired that at least two types of images, for example, an image of a person and an image of a landscape, are used as images to be corrected. In this connection, for example, the processes in steps S54 through S56 are repeated for the image of a person and the image of a landscape. As a result, the value of an correction level can be obtained depending on the type of image.

Figure 17:
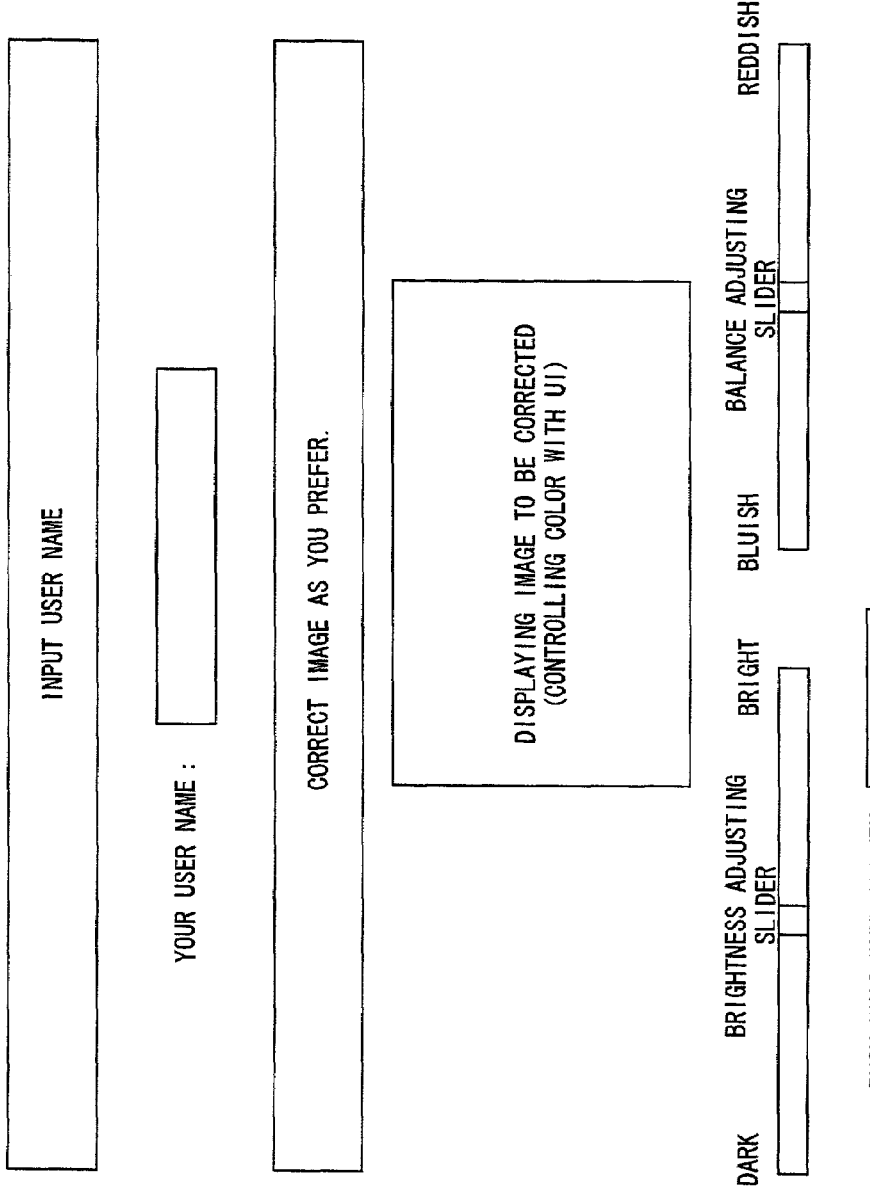
FIG. 17 shows an example of a screen displayed during the process of obtaining the preference of a user.

FIG. 17 shows an image to be corrected and a user interface displayed in step S51 shown in FIG. 16. The preference of a user is obtained by allowing a user to correct a predetermined image to be corrected. As the predetermined image to be corrected can be, as in the first embodiment of the present invention, a generally preferred image can be generated with the brightness and white balance by a system designer checking the preference of about 50 users. The image to be corrected is not limited to a generally preferred image, but can be a little bright image. In this case, if a user corrected result is the same as the first displayed image, it indicates that the user prefers bright images.

The screen shown in FIG. 17 is displayed, and the user is requested to input the user name. Then, a generally preferred image is displayed as an image to be corrected, and the user is requested to correct it into the user preferred level. The image displayed on the screen indicates the brightness and the white balance adjusted by the interlocking operations of the brightness slider and the balance adjusting slider using, for example, a mouse. Practically, the following equations similar to the equations described by referring to the correction to the brightness and the white balance in the first embodiment are used.

$$Rdisp_{ij}=(\alpha Rorg_{ij})^\gamma,\ Gdisp_{ij}=(\alpha Gorg_{ij})^\gamma,\ Bdisp_{ij}=(\alpha Borg_{ij})^\gamma$$

where Rorgij, Borgij, and Borgij are the RGB values of the pixel indicated by the coordinates i and j of the first image to be corrected to which the user has not made an correction, and Rdispij, Gdispij, and Bdispij are the RGB values of the pixel indicated by the coordinates i and j of the image displayed on the screen corresponding to the position of the slider after the user has made an correction.

The relationship between the position s of the slider and the values of α and γ can be obtained by the following equations. The position s of the slider is described as 0 for the center of the slider, −1 for the left end, and +1 for the right end.

$$\alpha=(1.4)^s,\ \gamma=(1.4)^s$$

For example, a user is first allowed to make an correction to an image of a person as an image to be corrected, and then to make an correction to an image of a landscape which is next displayed, thereby obtaining the preference of the user for each type of image.

Figure 18:
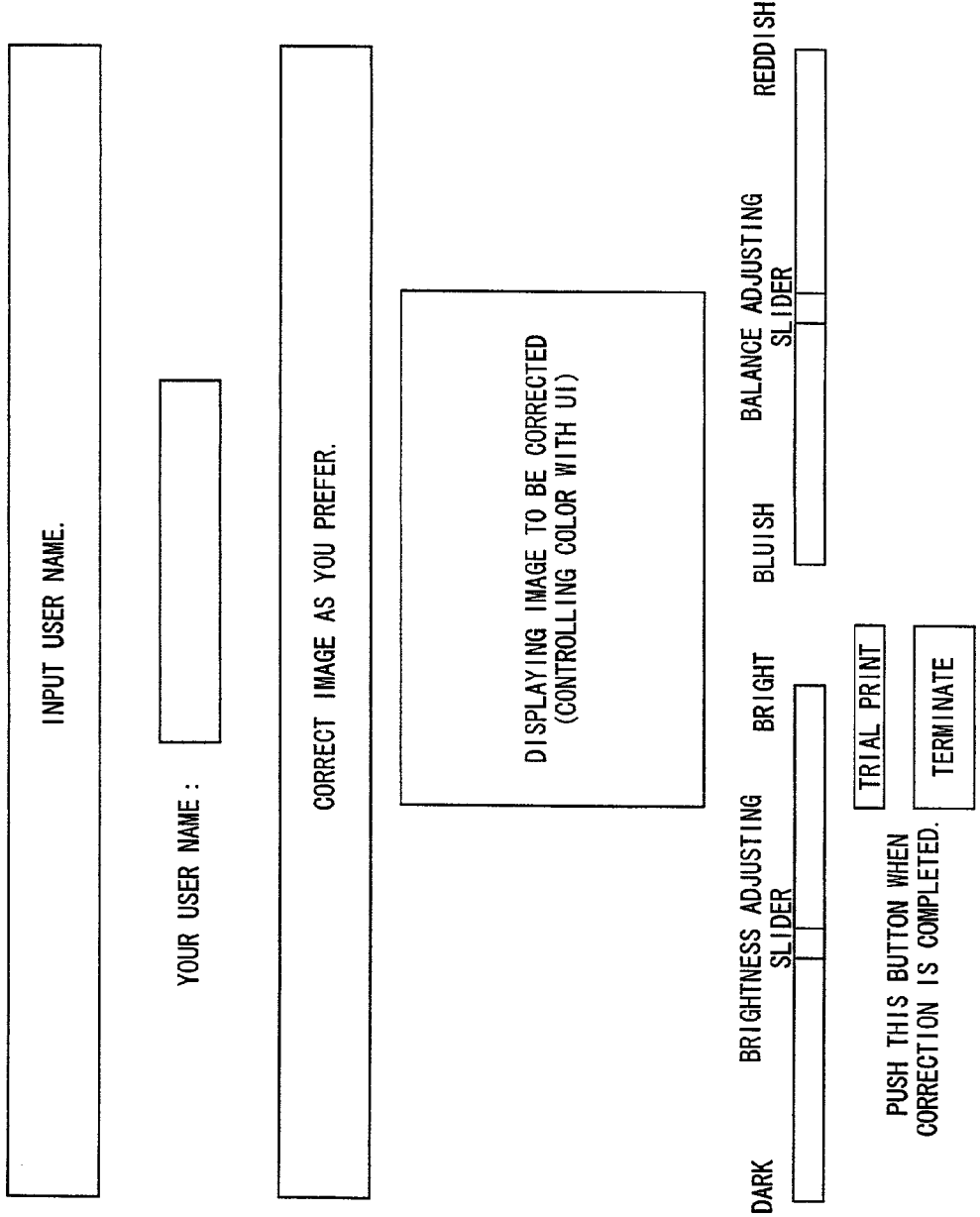
FIG. 18 shows an example of a display screen when a trial printing process can be performed.

FIG. 18 shows a user interface capable of realizing trial printing when a user requests to confirm an correction result of the user as a printed result in, for example, a printer system. A trial printing button is positioned above the termination button shown in FIG. 17. The user moves the brightness adjusting slider and the balance adjusting slider to change the white balance and the brightness of the displayed image to be corrected. If the displayed image is conformed as a printed result, the trial printing button is pressed to print the image. If the user is satisfied with the printed result, the termination button is pressed, thereby terminating the correction. If the user is not satisfied with the printed result, then the operation of pressing the trial printing button is repeatedly pressed after further changing the bright adjusting slider and the balance adjusting slider.

Figure 19:
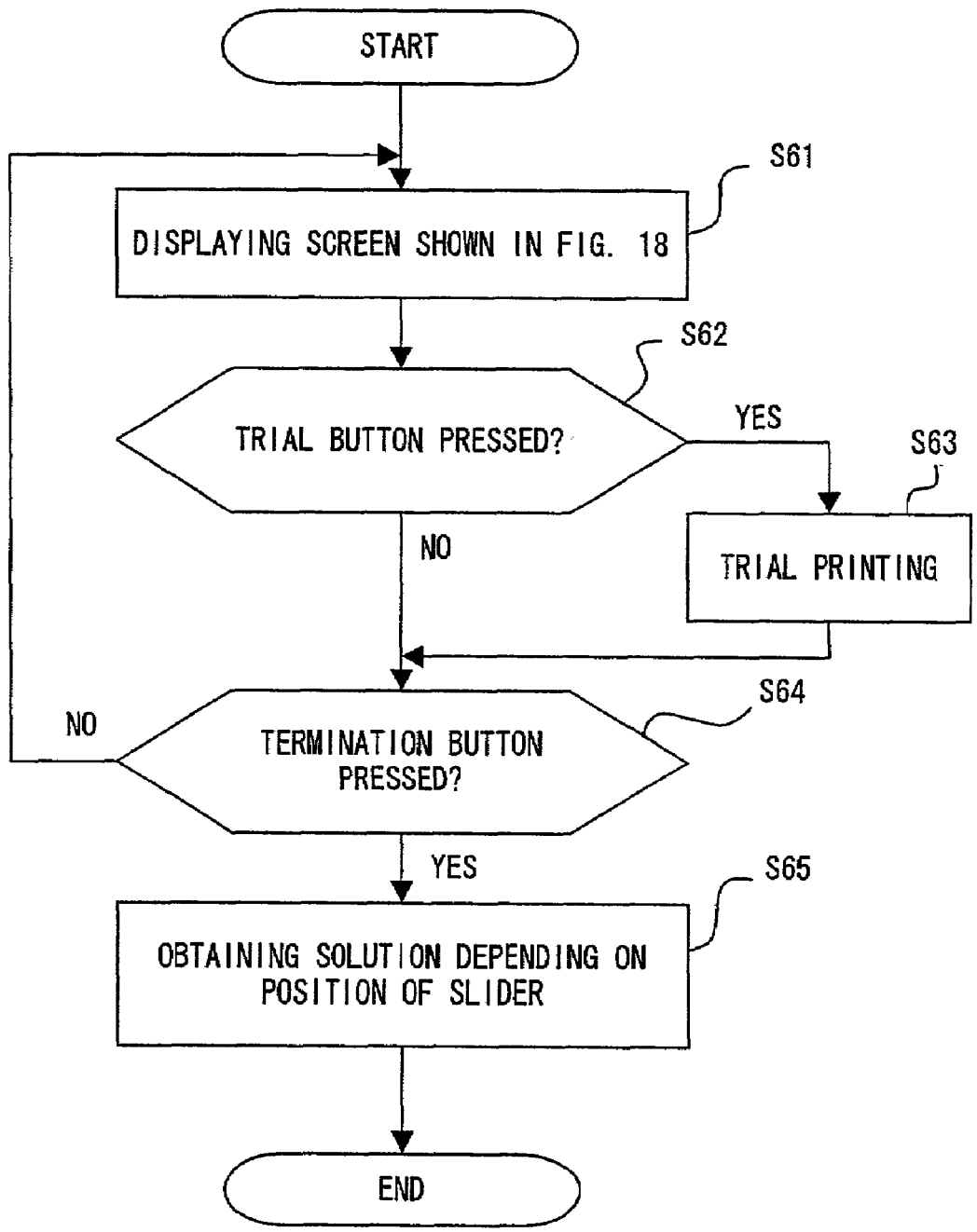
FIG. 19 is a detailed flowchart of the process up to the step of obtaining as a response an correction level preferred by a user corresponding FIG. 18.

FIG. 19 is a flowchart of the process of obtaining the response from the user by performing the trial printing process up to step S55. In FIG. 19, when the process starts, the screen shown in FIG. 18 is first displayed in step S61, and a user adjusts the brightness adjusting slider and the balance adjusting slider, thereby correcting the image. It is determined in step S62 whether or not the trial printing button has been pressed. If it has been pressed, a trial printing process is performed in step S63.

After a trial printing process is performed, or if it is determined in step S62 that the trial button has not been pressed, then it is determined in step S64 whether or not the termination button has been pressed. If it has not been pressed, control is returned to the process in step S61, and the user continues correcting an image. If it is determined in step S64 that the termination button has been pressed, then a response is obtained in step S65 from the user based on the position of the slider, thereby terminating the process.

In the above mentioned processes, the data indicating the preference of a user as described above by referring to the first embodiment as shown in FIGS. 14 and 15. By storing and using the data, the process of correcting an image to be corrected can be performed with the preference of a user taken into account. The process of correcting an image to be corrected with the preference of a user taken into account is the same as that in the first embodiment of the present invention, and the detailed explanation is omitted here.

As described above, an image to be corrected can be actually corrected by reflecting the preference of a user according to the second embodiment of the present invention. The process of obtaining the preference of a user requires an correction to an image by the user, but the image is corrected only by the adjusting operations performed using the brightness adjusting slider and the balance adjusting slider, thereby reducing the load for the user.

FIG. 20 shows loading a program into a computer. The image correction apparatus according to the present invention can be configured as a printer system by connecting a computer to a printer. The computer can have a common configuration.

FIG. 20 shows the configuration of the above mentioned computer. A computer 51 comprises a body 52 and memory 53. The memory 53 can be a storage device such as random access memory (RAM), a hard disk, a magnetic disk, etc. The program, etc. described by referring to FIGS. 2A through 5, 12, 16, and 19 is stored in the memory 53, and is executed by the body 52 to correct an image according to the present invention.

A program for realization of the present invention can be loaded into the computer 51 from a program provider to a network 54, or stored in a marketed and distributed portable storage medium 55 and then loaded into the computer 51.

The portable storage medium 55 can be various storage media such as a floppy disk, CD-ROM, an optical disk, a magneto-optical disk, etc. The above mentioned program is stored in such a storage medium and loaded into the computer 51 to correct an image based on the preference of a user according to the present invention.

Figure 21:
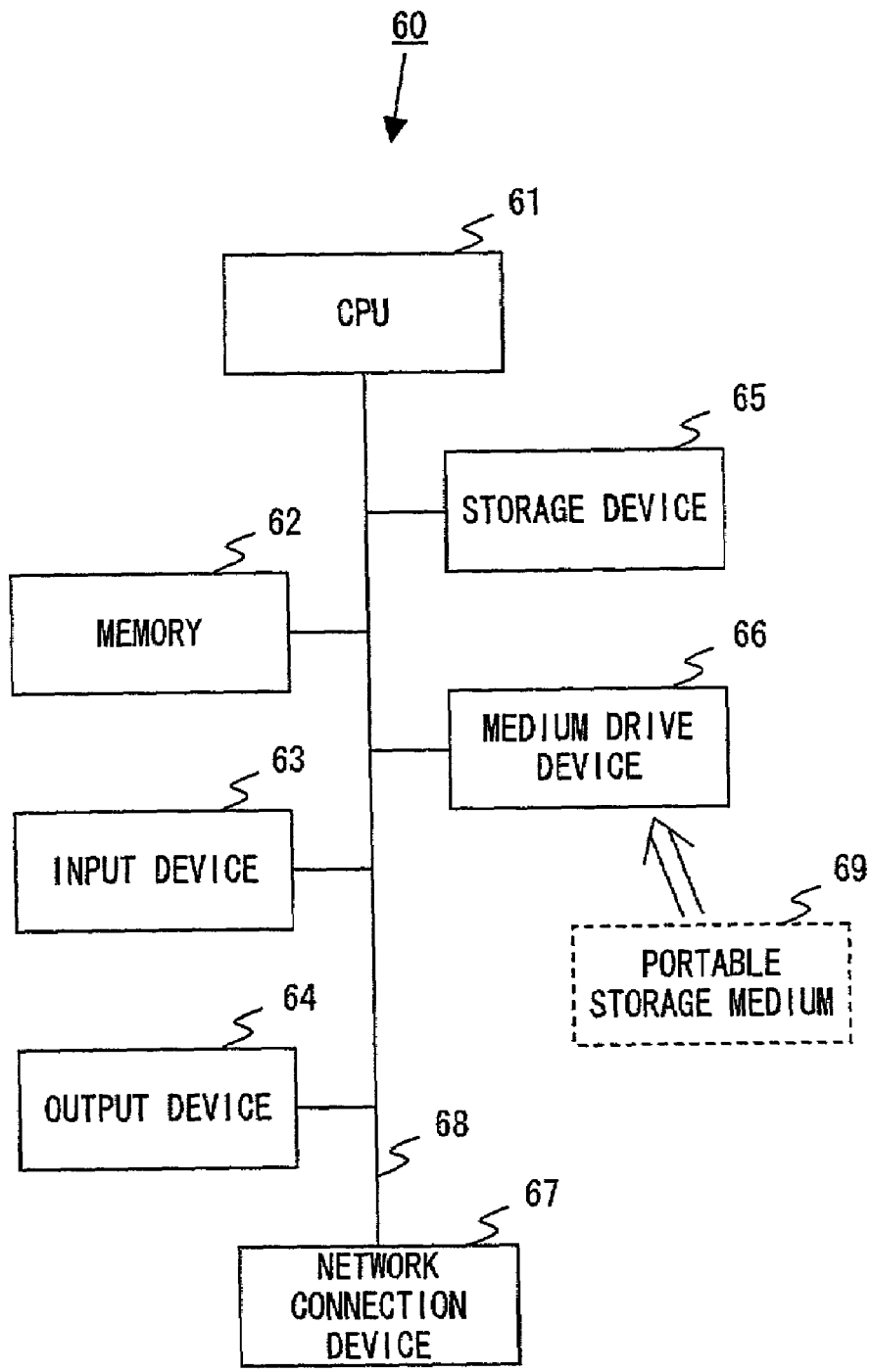
FIG. 21 shows the configuration of the hardware of a computer.

FIG. 21 shows an example of the hardware configuration of the information processing device for realizing the above mentioned processes.

An information processing device 60, a CPU 61, memory 62, an input device 63, an output device 64, a storage device 65, a medium drive device 66, and a network connection device 67. These units are connected through a bus 68. The configuration shown in FIG. 21 is an example, and the present invention is not limited to this configuration.

The CPU 61 is a central processing unit for controlling the entire information processing device 60.

The memory 62 can be RAM, etc. for temporarily storing a program or data stored in the storage device 65 (or the portable storage medium 69) when the program is executed, the data is updated, etc. The CPU 61 performs the above mentioned various processes using the program/data read to the memory 62.

The input device 63 can be, for example, a keyboard, a pointing device, a touch panel, etc., and is used inputting an instruction from a user and information.

The output device 64 can be, for example, a display, a printer, etc., and displays (or prints), for example, an image at an correction level and an image to be corrected.

The storage device 65 can be, for example, a magnetic disk device, an optical disk device, a magneto-optical disk device, etc., and stores a program/data for realization of various processes and configurations as the above mentioned image correction apparatus.

Otherwise, the program/data can be stored in a portable storage medium 69. In this case, the program/data stored in the portable storage medium 69 is read by the medium drive device 66. The portable storage medium 69 can be, for example, an FD (floppy disk, CD-ROM, a DVD, a magneto-optical disk, etc.

Furthermore, the block diagram program/data can be downloaded from an external device connected by the network connection device 67 through a network. The present invention can be configured as a storage medium (the portable storage medium 69, etc.) itself storing the above mentioned program/data, can be configured as a network (transmission medium) itself for transmission of the above mentioned program/data, or can be configured as a transmission signal itself transmitted through the transmission medium when the program/data is downloaded.

As described above in detail, according to the present invention, an image can be corrected with high precision based on the preference of a user with a load for the user successfully reduced. For example, the preference of a user is obtained based on an image generally preferred by about 50 users, and an image to be corrected is actually corrected using the data indicating the obtained preference. As a result, an corrected image satisfactory for the user can be provided. By applying this system to image processing software, a printer, etc., the practicability of a digital color image can be improved for a common user.

What is claimed is:

1. An image correction apparatus which corrects a correction target image based on preference of a user, comprising:
a user preference obtaining unit outputting a plurality of corrected image variations of a given image, the variation corrected images including one representing the corrected image of a quality preferred widely among a large number of people and having been stored in said image correction apparatus;
allowing the user to select a preferred one from the corrected image variations;
deriving a preference data set of the user according to a result of the user's selection and the given image and storing the preference data set; and
an image correction unit, so required, automatically correcting the correction target image in a predetermined manner and using the stored preference data set to correct further the image resulting from the automatic correction.

2. The apparatus according to claim 1, wherein
said given images are a plurality of images, and said user preference obtaining unit outputs images at two or more correction levels corresponding to the plurality of given images to allow the user to select preferred corrected images.

3. The apparatus according to claim 2, wherein
said plurality of given images are different in type, and said user preference obtaining unit allows the user to selects preferred corrected image corresponding to each type.

4. The apparatus according to claim 1, further comprising:
a user specified image input unit receiving a user specified image as the given image.

5. The apparatus according to claim 1, wherein
said user preference obtaining unit requests a user to input a user identifier for identification of the user, and allows each user to select a preferred corrected image.

6. The apparatus according to claim 1, wherein:
said user preference obtaining unit prints and outputs images at two or more correction levels; and
said apparatus further comprises a image printing unit printing and outputting an image to be corrected which has actually been corrected by said image correction unit.

7. An image correcting method for correcting a correction target image based on preference of a user, comprising:
outputting a plurality of corrected image variations of a given image, the variation of corrected images including one representing the corrected image of a quality preferred widely among a large number of people and having been stored by said image correcting method;
allowing the user to select a preferred one from the corrected image variations;
deriving a preference data set of the user according to a result of the user's selection and the given image and storing the preference data set; and
automatically correcting the correction target in a predetermined manner and using the stored preference data set to correct further the image resulting from the automatic correction.

8. A process of adjusting an image according to preferences of several users, comprising:
displaying adjusted images to each of the users where the adjusted images are an original image to which different levels of adjustment have been applied;
allowing each of the users to select one of the adjusted image as preferred adjusted image;
determining the preferred adjusted image preferred by the users as a group preferred adjusted image;
storing adjustment parameters associated with the group preferred adjusted image;
presenting to a new user the group preferred adjusted image and variations of the group preferred adjusted image;

allowing the new user to select one of the group preferred or variation images; and automatically adjusting subsequent images for the new user responsive to the selection by the new user.

9. An image correction apparatus which corrects a correction target image based on preference of a user, comprising:

a user preference obtaining unit outputting a plurality of corrected image variations of a given image, the variation of corrected images including one representing the corrected image of a quality preferred widely among a large number of people and having been stored in said image correction apparatus;

allowing the user to select a preferred one from the corrected image variations;

deriving a preference data set of the user according to a result of the user's selection and the given image and storing the preference data set; and an image correction unit, so required, automatically correcting the correction target image in a predetermined manner and using the stored preference data set to correct further the image resulting from the automatic correction, wherein a user may register various kinds of preferences using different user name variations respectively.

* * * * *

UNITED STATES PATENT AND TRADEMARK OFFICE
CERTIFICATE OF CORRECTION

PATENT NO. : 7,444,038 B2  Page 1 of 1
APPLICATION NO. : 09/819731
DATED : October 28, 2008
INVENTOR(S) : Masayoshi Shimizu et al.

It is certified that error appears in the above-identified patent and that said Letters Patent is hereby corrected as shown below:

Column 16, Line 22, change "to selects" to --to select a--.

Signed and Sealed this

Twentieth Day of January, 2009

JON W. DUDAS
*Director of the United States Patent and Trademark Office*